United States Patent [19]

Basham et al.

[11] Patent Number: 5,420,727
[45] Date of Patent: May 30, 1995

[54] ERROR CONTROLLED VOLUME SERIAL IDENTIFICATION FOR VARIED TRACK DENSITY SYSTEMS

[75] Inventors: Robert B. Basham; Jonathan M. Kiser; Ara S. Patapoutian, all of Tucson, Ariz.

[73] Assignee: International Business Machines Corporation, Armonk, N.Y.

[21] Appl. No.: 186,363

[22] Filed: Jan. 24, 1994

Related U.S. Application Data

[63] Continuation of Ser. No. 784,839, Oct. 30, 1991, abandoned.

[51] Int. Cl.6 ............................................. G11B 5/09
[52] U.S. Cl. ..................................... 360/48; 360/49; 360/27; 360/39; 360/40; 360/72.2
[58] Field of Search ................... 360/72.2, 72.1, 27, 360/48, 49, 14.1, 14.2, 14.3, 40, 39; 369/54, 58, 48, 47, 59, 60, 61, 62, 124, 32, 44.34; 371/49.1; 341/173, 55, 87, 106

[56] References Cited

U.S. PATENT DOCUMENTS

| | | | |
|---|---|---|---|
| 4,644,418 | 2/1987 | Banno et al. | 360/39 |
| 4,685,005 | 8/1987 | Fields, Jr. | 360/53 |
| 4,800,550 | 1/1989 | Yamauchi | 369/59 |
| 4,802,154 | 1/1989 | Verboom et al. | 369/59 |
| 5,084,852 | 1/1992 | Bailey | 369/59 |
| 5,130,966 | 7/1992 | Yoshio et al. | 369/59 |

FOREIGN PATENT DOCUMENTS

6014057 12/1983 Japan.
2080997 7/1980 United Kingdom.

OTHER PUBLICATIONS

IBM Technical Disclosure Bulletin, vol. 19, No. 5, Oct., 1976, pp. 1619–1620, "Magnetic Tape Identification".

*Primary Examiner*—Georgia Y. Epps
*Assistant Examiner*—Muhammad N. Edun
*Attorney, Agent, or Firm*—M. W. Schecter

[57] ABSTRACT

A tape drive subsystem discloses that variable length symbols can be used to reliably identify data stored on the tape. Machine controlling procedures are disclosed to encode and decode data for the reliable sensing of the serial number of a media, especially tape cartridges, having different track densities. The subsystem detects the serial number of the media and corrects, or at least detects, error patterns. A variable length symbol code is encoded in a plurality of groups with each group having a "one" being represented as an erase gap ERG signal covering a first two units of a group, and a "zero" is represented as one unit of an ERG signal, both followed by four units of an Inter Block Gap IBG signal.

54 Claims, 7 Drawing Sheets

ERROR CONTROLLED VOLUME SERIAL IDENTIFICATION FOR VARIED TRACK DENSITY SYSTEMS

The application is a continuation of application Ser. No. 07/784,839, filed Oct. 30, 1991, now abandoned.

DOCUMENTS INCORPORATED BY REFERENCE

Additional description of the tape system may be found in the following references, each of which is hereby incorporated by reference: U.S. Pat. Nos. 4,125,881, 4,435,762 and 4,467,411 disclose various aspects of the operation of a tape system; U.S. Pat. Nos. 4,334,656, 4,339,936, 4,389,600 and 4,406,425 disclose various aspects of the tape path for a tape system; U.S. Pat. No. 4,685,005 discloses a 36-track interleaved transducing head for a tape system; U.S. Pat. No. 4,452,406 discloses a tape cartridge for a tape system; and U.S. Pat. Nos. 4,454,282, 4,525,424 and 4,568,611 disclose tape media for a tape system.

1. Field of the Invention

This invention relates generally to dynamic storage devices and more particularly to a media format for encoding, sensing and correcting data representing an identifier for a volume of data information, and to a process for controlling a data processing system to accomplish same to permit the reliable sensing of encoded data encoded on media having different track densities.

2. Description of the Related Art

Modern tape drive systems use a reel-to-reel drive to move a tape back and forth in close proximity to one or more read and/or write transducing heads. Upon insertion of a single reel tape cartridge into a tape drive, a leader block attached to the longitudinal end of the tape is automatically threaded through the tape path and the tape is spooled upon the take-up reel. During such threading and spooling, the length of tape wound upon the supply reel (the single reel tape cartridge inserted into the tape drive) is determined using tachometers on the supply and take-up reels. The tachometers are used to measure the amount of rotation of such reels during a specified period. The amount of rotation of the supply reel during one or more rotations of the take-up reel is inversely related to the length of tape on the supply reel. Thus, the length of tape wound upon the supply reel can be determined using well known mathematics. The length of tape measurement is used to properly adjust the tape velocity and tape tension for the most reliable system operation, and for rejecting out of specification tape cartridges.

Upon threading of the tape in a tape system, a step is formed in the tape as it wraps upon itself on the take-up reel. Depending upon the conditions, the step may become embossed in the tape. Reliable reading and/or writing may not be possible at or near such a step. The IBM 3480 and 3490 tape systems record user data in 18 parallel tracks, as is known, including two 8-bit bytes and two parity bits (one parity bit for each byte) across the tape width. Because each bit is recorded at a single tape location, the lack of a smooth recording surface at the head-tape interface can result in the irreparable loss of one or more bits. Fortunately, the step decreases with each successive wrap of the tape upon the take-up reel. The amount of tape required to be wrapped upon the take-up reel to decrease the step to a size small enough to permit reliable read/write activity can be determined experimentally. Thus, enough tape is spooled upon the take-up reel to ensure that the recording of data does not begin until such can occur reliably.

In the IBM 3480 and 3490 tape systems, the point on a tape at which the recording of user data is first permitted is referred to as the logical beginning of tape (LBOT). The LBOT is defined in the tape system control unit as a specified distance from the tape leader block. In the IBM 3480 and 3490 tape systems, the first user data recorded after a physical beginning of tape (PBOT) is a format identifier (FID). A volume is a physical data unit for convenient handling. In a tape system, the data recorded on a single tape cartridge is considered to be a volume as it can be conveniently mounted in a tape drive.

The format identifier (FID) is a pattern recorded on a tape prior to the LBOT. The specific pattern used, also referred to as the "type" of FID, is indicative of the format of data recorded (or to be recorded) after the LBOT. The point on a tape where the FID begins is referred to in the IBM 3480 and 3490 tape systems as the physical beginning of tape (PBOT). The PBOT is defined in the tape device, not the tape system control unit, as a specified distance from the tape leader block. Although a FID is a form of recorded data, it is not user data, and can be reliably written on and read from the tape prior to the LBOT, even in proximity to a step, because of the uniqueness of the recorded pattern. The type of FID is therefore determined by the tape system, upon tape cartridge mounting, prior to the LBOT being positioned in proximity to the transducing head.

By identifying the type of FID, a tape system can signal an operator to remove a tape cartridge, therefrom, if the format of data recorded on the tape is not compatible therewith. The lack of a FID normally indicates a blank volume. When no FID is detected in the IBM 3480 and 3490 tape systems, the tape is rewound from the LBOT to the PBOT and a FID is recorded therebetween upon receiving a command from the host processor to write the data that may include a volume serial identification data (VOLSER). Upon subsequent mounts of the tape, the proper FID should be located. Should the host processor command that a new VOLSER be written (or that the same VOLSER be rewritten), the system writes the FID again. Should the host processor command that the tape be rewound, such an operation occurs under the control of the tape device, not the tape system control unit. Tape device control permits the control unit to logically disconnect from the tape device to direct other tape system operations. Because the PBOT, and not the LBOT, is known to the tape device, such tape device control results in the tape being rewound to the PBOT. To access user data on the tape, the tape must subsequently be advanced past the LBOT. The aforementioned tape movement between the PBOT and the LBOT significantly impacts tape system performance.

The IBM 3490E Magnetic Tape Subsystem records data in 36 parallel tracks using a 36-track interleaved read/write transducing head. Data is written in two sets of 18 interleaved tracks, including the same number of bits and bytes per set as in the 18-track format. Beginning at a first longitudinal end of a tape, the first set of 18 tracks of data, the odd set, are written in a first direction of tape movement until the opposite end of the tape is approached. The direction of tape movement is then reversed and the second set of 18 tracks, the even set, are written, interleaved among the first set of tracks, until the first end of the tape is again approached.

All of the current IBM tape drive systems currently employ the same magnetic tape cartridge which includes a single reel containing a length of ½ inch wide magnetic tape. To achieve the increased number of tracks, a track written by the IBM 3490E tape system is significantly narrower than a track written by the IBM 3480 and 3490 tape systems. Data written by the IBM 3480 and 3490 tape systems can be read by the IBM 3490E tape system because the tracks are wider than the read/write elements of the IBM 3490E tape system transducing head. However, user data written on the cartridge by the IBM 3490E tape system cannot be read by the IBM 3480 and 3490 tape systems because the tracks are too narrow to be reliably sensed by the read/write elements of its transducing head. A different type of FID is written by the IBM tape systems to distinguish data written in the 18-track format from data written in the 36-track format. The FID information is used by the IBM 3490E tape system to sense and reject operations incompatible with its 36-track format, thereby ensuring that all data written on a tape is in the format compatible with its track density.

The IBM 3490E tape system writes a FID in such a way as to enable the 18-track systems to read such 36-track FID. The IBM 3490E tape system writes the FID tones for the 36-track format on the odd set of 18 tracks, as does the previous IBM tape systems. In addition, the IBM 3490E tape system writes logical zeroes on the even set of 18 tracks (with the direction of tape movement reversed) between the PBOT and the LBOT. The logical zeroes on the other set of 18 tracks are recognized as mere noise by the 18 track transducing head during reading of the 36-track FID.

In certain situations, it is desirable that an 18-track tape drive be capable of reading the serial number of a tape cartridge that is formatted by a 36-track tape drive. The volume serial identification data (VOLSER) is encoded as a string of variable length binary symbols. Conventional error control schemes, such as an error correction control ECC or a cyclic redundancy code CRC, are not efficient enough to detect and/or correct errors because of the variable nature of the symbols. If a symbol is not detected correctly, then the reference of the symbols is lost and all subsequent symbols may be decoded incorrectly. Consequently, an ECC or CRC may not be sufficient to correct all of the errors that may result from the loss of the reference point.

What is needed is the ability to write an identifier to the data volume stored on the tape in any track density subsystem that can be readable on any other track density device. In particular, what is needed is a format for a volume serial identifier signal which is written by a 36-track tape drive device and can be reliably read by both an 18 and a 36-track tape drive.

SUMMARY OF THE INVENTION

In view of the foregoing, it is the principal object of this invention to provide an enhanced tape system.

Another object of this invention is to provide a tape system which can distinguish between different media track densities, yet provide an error sensitive volume serial identification for varied track density systems.

Yet another object is to provide a novel error correction and look-ahead polling procedure that, in addition to detecting the serial number, also detects and corrects error patterns by using the inherent characteristics of the variable nature of the code.

Machine controlling procedures are disclosed to code and decode data for the reliable sensing of the serial number of a media, especially tape cartridges having different track densities. Both 18-track and 36-track tape cartridges must be capable of being dependably identified by either drive. The encoding permits decoding that will detect the serial number of the media and correct, or at least detect, error patterns.

A variable length symbol code volume serial identification number (VOLSER) of the Volume ID (VOLID) is encoded with a one ("1") being represented as a "high level" or erase gap signal (ERG) covering the first two units of a group, that is, a one is represented as two units of a high level signal, an ERG, and a zero ("0") being represented as one unit of a high level signal, an ERG, covering the first unit of the group, that is, a zero is represented as one unit of an ERG. The symbols, whether a one or a zero, are separated by an Inter Block Gap (IBG) signal which is a "low level" (IBG) covering four units of the VOLSER group.

In the first algorithm, units two and an additional four units later are sampled and the decoder decodes them into a "1" or a "0" or an indeterminate ("?") symbol. An error can be detected or corrected if a single error occurred. If the symbols read are the same, either both a one, both a zero, or both indeterminate, an uncollectible error is detected. The next symbol sampling is at the eighth unit if the group is detected as a one or at the seventh unit if the group is detected as a zero. VOLID decoding continues after the detected error is corrected.

In the second algorithm, an uncorrectable error of the first algorithm can be corrected by sampling the first two units of the next group. A decoding table in the flow of the procedure is consulted to determine the symbols of the first and second group. The symbols are assumed to be a certain state when the status of the second group are determined to be in one certain sequence. A parity symbol is added to determine whether the symbols assumed from the certain sequence are correct as determined by the parity count, or whether the symbols should be reversed if the parity count is different from that accompanying the VOLSER.

BRIEF DESCRIPTION OF THE DRAWINGS

The various novel features of this invention, along with the foregoing and other objects, as well as the invention itself, both as to its organization and method of operation, may be more fully understood from the following description of illustrated embodiments when read in conjunction with the accompanying drawing wherein.

DETAILED DESCRIPTION OF THE DRAWINGS

Figure 1:
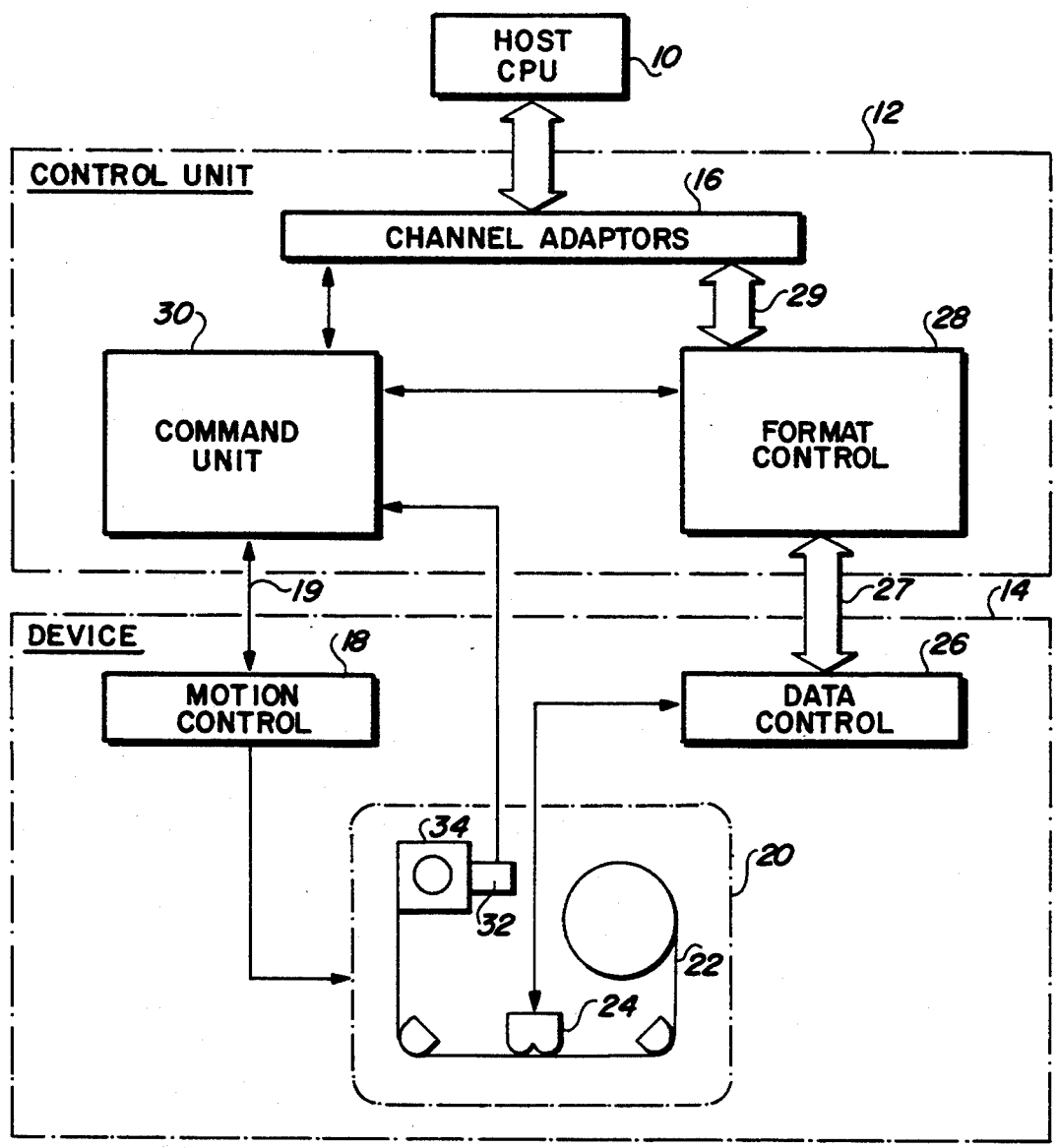
FIG. 1 is a schematic block diagram of a tape system according to the invention.

In general, the present invention can be used with any processing device that uses a rewritable and erasable media where a volume identifier or any critical subset of data is needed that can be encoded and decoded reliably in different track density devices. The present invention is specifically directed to the recording of data using a very high track density magnetic head (36 tracks of the preferred embodiment) that is readable by a lower track density magnetic head (18 tracks of the preferred embodiment). The present invention is preferable for use with a magnetic media and, in particular, for use with a magnetic tape media stored in a casing such as a cartridge or cassette. The invention, as described, is shown for use in an IBM 3490E tape subsystem. It should be evident that any other type of subsystem is adaptable for use with the present invention. The present invention is equally adapted to any of the type of systems by anyone skilled in the art as taught within the following description.

Referring now more particularly to the drawing, like numerals denote like features and structural elements in the various figures. The invention will be described as embodied in magnetic tape systems for use in data processing environments. In the preferred embodiment, the tape systems discussed are the IBM 3480, the IBM 3490, and the IBM 3490E Magnetic Tape Subsystems upgraded as described according to the present invention.

In general, referring to FIG. 1, a data processing system is controlled by at least one host central processing unit (CPU) 10 to store, retrieve and manipulate data for use in the data processing environments. The data processing system includes at least one control unit 12 and at least one device, the magnetic tape recording device 14. The control unit 12 accepts the commands and data from the CPU 10 via channel adaptors 16, and controls itself and the devices accordingly. The devices could be the magnetic tape recording devices 14, as shown in the embodiment of FIG. 1, or magnetic disk or optical recorders.

Figure 2A:
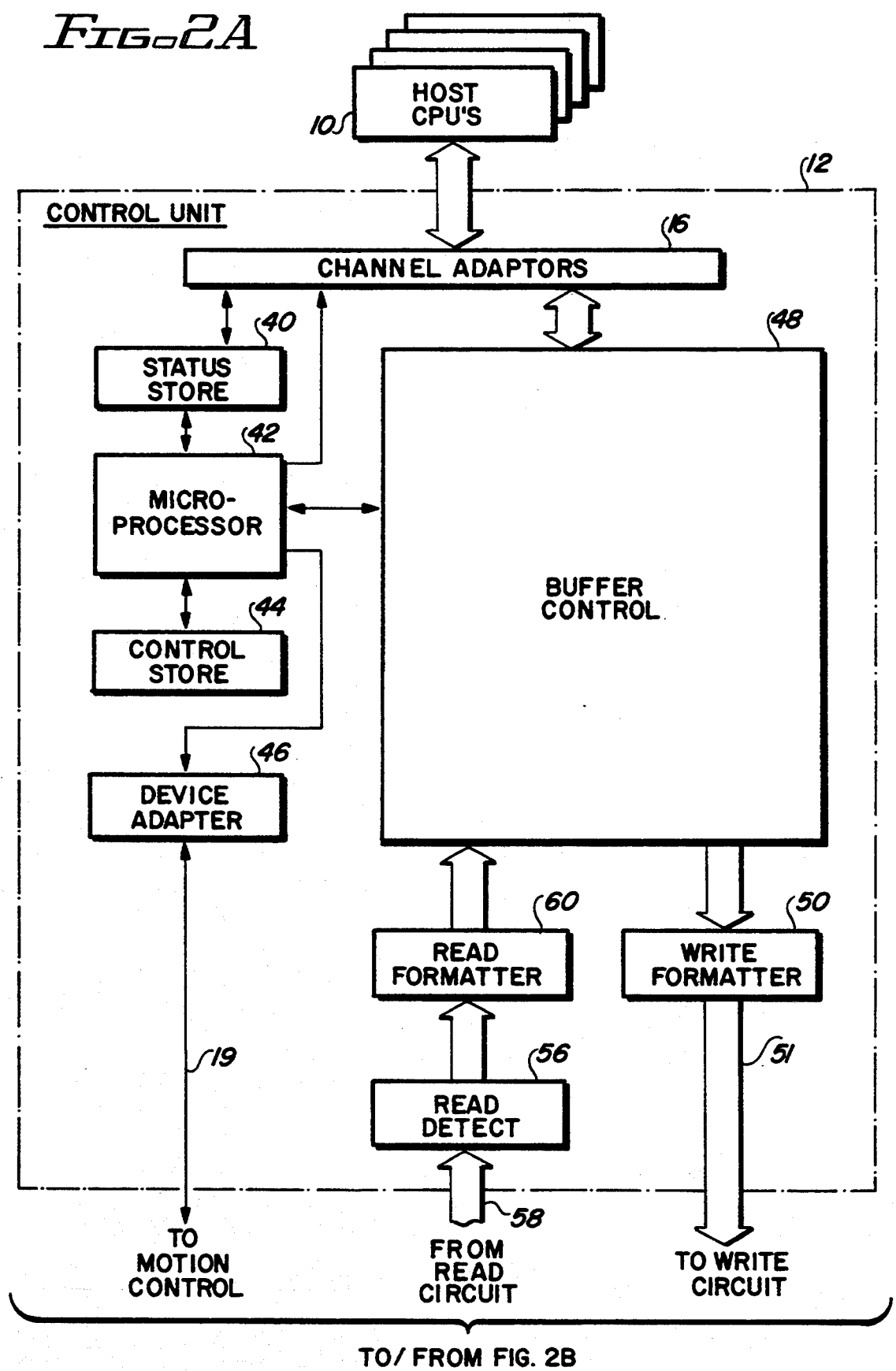
FIGS. 2A and 2B are a schematic block diagram of the control unit of FIG. 1 in greater detail.
Figure 2B:
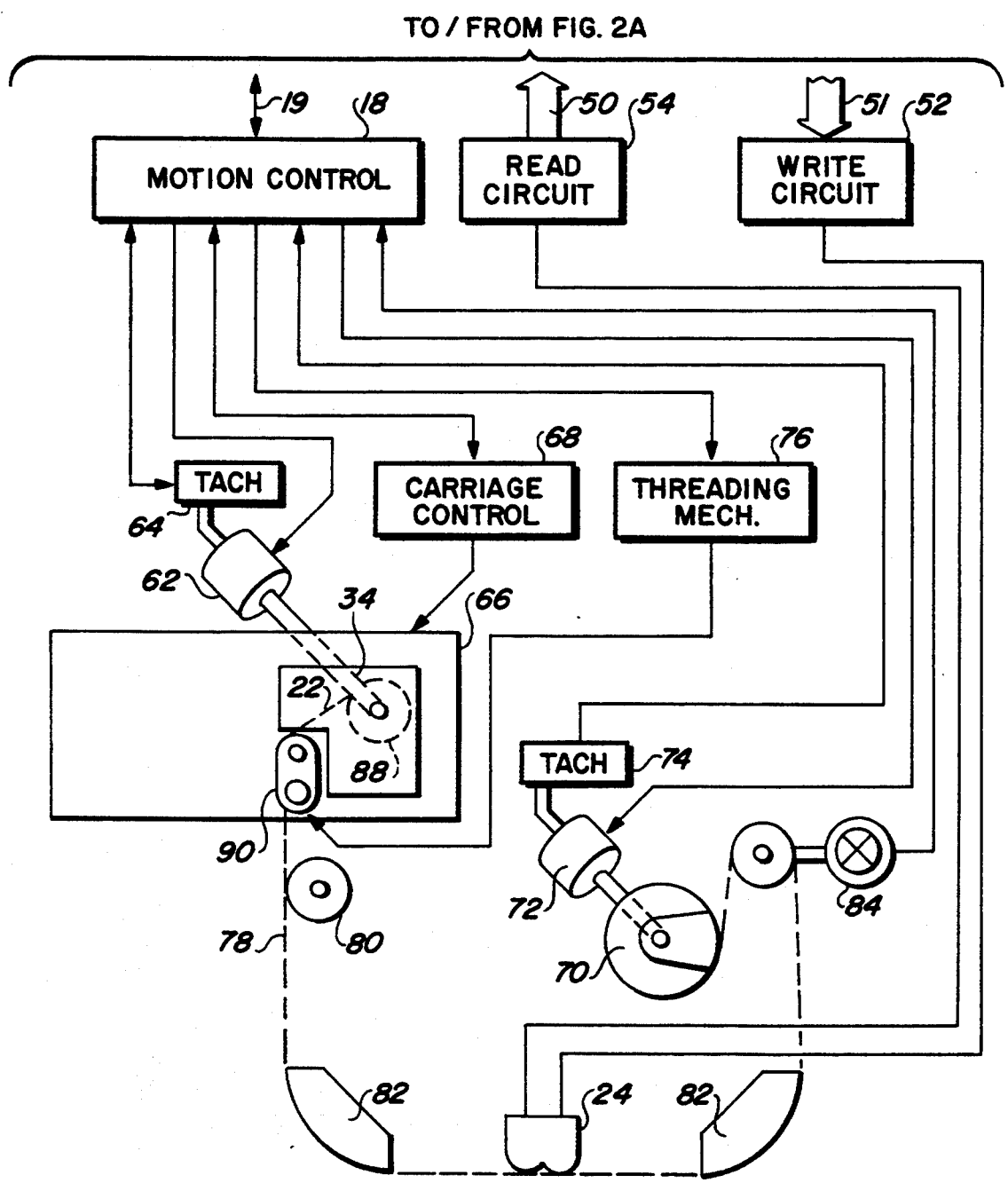

The magnetic tape recording device 14 includes a means for controlling the handling of the tape media, a motion control 18 and the device mechanism in a drive 20 for transporting of a tape 22 past a magnetic head 24 for writing and reading data to and from the tape media. Generally, a data control 26 provides read and write circuits in the device 14 to operate the head 24. The data control 26 is connected by a cable 27 to a format control 28 in the control unit 12. The format control 28 is shown connected by a data cable 29 to the channel adapter 16. The motion control 18 is controlled by a command unit 30 in the control unit 12. The command unit 30 takes the commands transmitted to the channel adaptors 16, by the hosts 10, and controls the operation of the drive 20 via the motion control 18 and the flow of data to and from the channel adaptors 16 through the format control 28 and the data control 26. FIGS. 2A and 2B show a more detailed block diagram of the data processing systems of FIG. 1. FIG. 2A shows a block diagram of the control unit 12, and FIG. 2B shows a block diagram of the device 14. The bottom of FIG 2A is connected by cable and command lines to the top of FIG 2B.

Referring to FIGS. 2A and 2B, the command unit 30 of FIG 1 includes a status store 40, a microprocessor 42, a control store 44, and a device adaptor 46. A buffer control 48 operates under control of the microprocessor 42 to store the data written on tape 22 by a write formatter 50 and a write circuit 52 of FIG. 2B which, in turn, is connected to the head 24. The buffer control 48 also controls the data flow on a read cycle to store the data processed by a read circuit 54 from the head 24 and transmitted to a read detect circuit 56 over a connecting cable 58. The read detect circuit 56 is connected to a read formatter 60 which, in turn, is connected to the buffer control 48.

The tape recording device of FIG. 2B shows the drive 20 under control of the motion control 18 to accomplish the controlled transporting of the tape 22 past the head 24 to accomplish the reading and writing of the magnetic transitions from and to the tape 22, and is useful in the present invention. The tape recording device 14 includes a supply reel motor 62 and a tachometer control 64, a carriage 66, and a carriage control 68, a take-up reel 70 and its motor drive 72 and tachometer control 74, a threading mechanism 76, various controls of a tape path 78, such as an idler wheel 80, compliant tape guides 82, and a tape tension control 84. The tape media 22 of this disclosed embodiment is contained in a cartridge 86 shown placed into the carriage 66. The cartridge 86, besides the tape 22, includes a supply reel 88 and a leader block 90, shown connected for threading by the threading mechanism 76. In the drawings, like reference numbers indicate like parts and structural features in the various figures of the drawing.

The documents incorporated by reference show a description of the processing of the data on a tape media system, a control circuit usable for a reel-to-reel tape drive as shown in FIG. 2B, a cartridge tape drive unit and the threading mechanism 76, and a cartridge tape media of the device useful as the cartridge 86.

The head 24 can be an 18-track magnetic transducing head or a 36-track interleaved magnetic transducing head, depending upon the particular tape system. Each type of head writes a unique type of FID on the tape 22 to indicate the recording format (18-track or 36-track) of data written thereby.

Figure 3A:
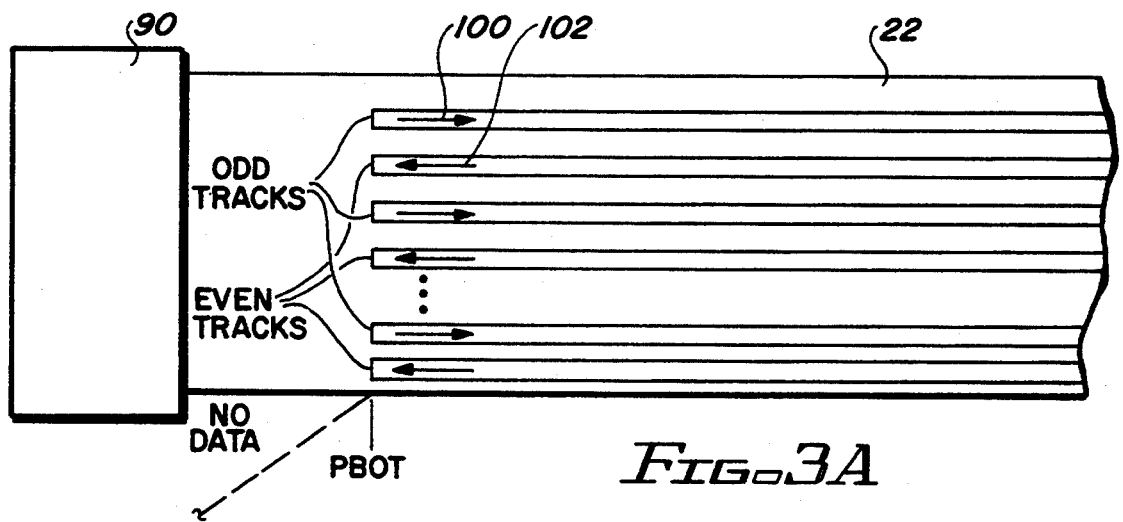
FIGS. 3A, 3B and 3C shows a section of magnetic tape prepared according to the present invention.
Figure 3B:
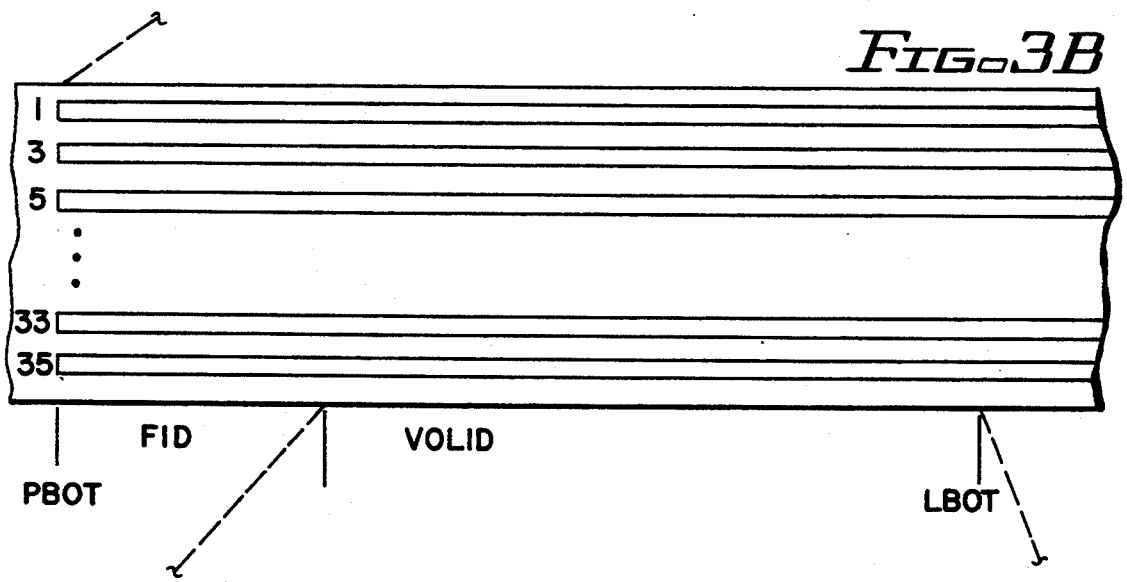
Figure 3C:
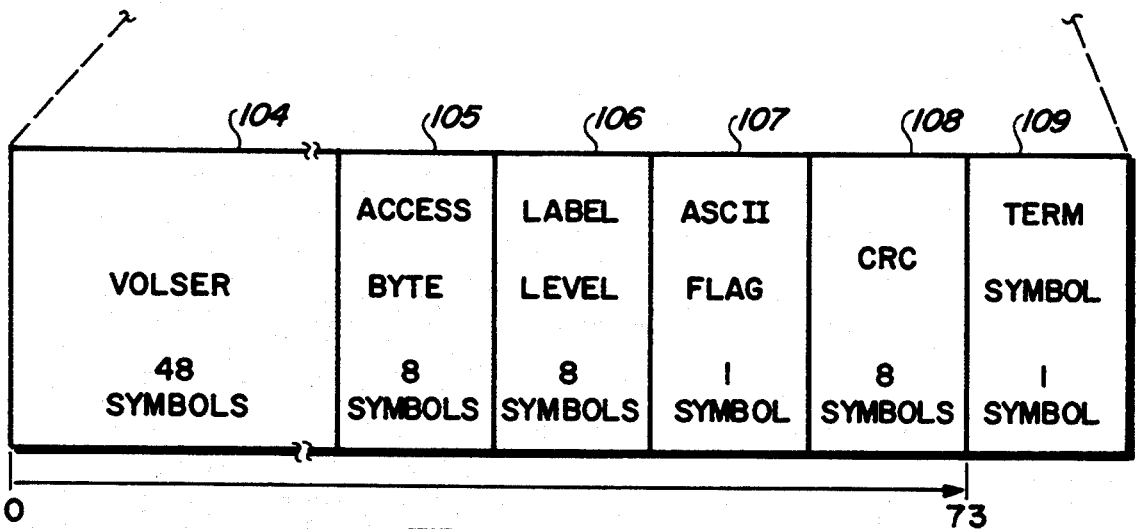

FIGS. 3A, 3B and 3C shows the location of the information placed at the beginning of the tape 22 after the leader block 90. As is shown in FIG. 3A, a first portion of the tape 22 does not contain any data or any signals which can be used to identify the tape 22 and its cartridge 34. This "no data" section is the portion of the tape 22 that is wrapped over the take-up reel 70 to cushion the succeeding length of tape from any take-up reel irregularities. In the IBM 3490E Tape Drive the data is placed onto a plurality of odd and even tracks to a total of 36 tracks, see FIG. 3A. The odd tracks are recorded in the direction shown by the arrow 100. All of the odd tracks are recorded at one time in this direction. The even tracks are recorded in the opposite direction as shown by the arrow 102. The recording starts at the physical beginning of tape (PBOT). The remainder of the tape length from the physical beginning of tape (PBOT) to a logical beginning of tape (LBOT), as shown in FIG. 3B, is set by a tape volume label standard, ANSI X327-1978, level 4, for the IBM 3480/3490 Tape Drives, as updated to include a volume identifier, shown in FIG. 3B, as the volume ID (VOLID) section. A format identifier mark (FID) precedes the VOLID section.

The FID region is recorded at the beginning of the tape 22 after the PBOT when a write command is issued while the tape is positioned at either the physical beginning (PBOT) of the tape or the logical beginning (LBOT) of the tape. When the tape is positioned at the LBOT, the control unit 12 repositions the tape so that the FID mark begins at the PBOT. The FID mark provides the subsystem with an indication of which format is being used to record the data on the tape. The subsystem uses the mark to determine if it is capable of reading the data or adding data to the end of the previously written data.

The VOLID format is shown in FIG. 3C. The VOLID region includes a volume serial number (VOLSER) section 104, an accessibility byte section 105, a label standards level section 106, an ASCII flag section 107, a cyclic redundancy checking (CRC) section 108, which is an error checking section, and a termination symbol section 109. The termination symbol of section 109 is a totally different symbol from any standard one or zero symbol. Generally, the termination symbol is a standard ERG followed by an IBG. The termination symbol is used as a "loss of sync" indication, which is an error determination showing that whatever was read previously in the VOLID is incorrect.

The VOLID region is written as the first record on the volume recorded on the tape. The volume identifier, the VOLSER, is used by the host operating system to determine the disposition of the data recorded on the tape. The customer data in block 0, according to the aforementioned tape volume label standards, contains a VOL1 section which is the first four bytes, bytes 0-3, encoded in either ASCII or EBCDIC. This section starts the recording of the identification of the data recorded on the tape. The VOLSER covers bytes 4-9 witch each byte corresponding to a character in the VOLSER recorded in either ASCII or EBCDIC.

Once the VOLID region is written it is not changed by the control unit unless block zero is rewritten for the entire cartridge. With the present invention, the VOLID region will be capable of being sensed by all tape drive devices using the cartridge of this design. If the cartridge mounted on the drive does not have a valid tape format ID in the FID region, it is considered to be a void tape. The VOLID region is recorded immediately following the FID mark and precedes the LBOT. According to the present invention the VOLID, and especially the VOLSER, is composed of a set of specially defined patterns of marks which encode the volume identification information.

The 18-track format data written on the tape 22 may be read by a 36-track tape system. The problems arise when it is necessary to read the VOLID information from a 36-track tape system in an 18-track tape system. The tape cartridge 34 is designed to be inserted into either an 18-track tape system or a 36-track tape system. All tape systems must be able to distinguish between track density and tape recording formats to minimize attempts to access data on tapes incompatible therewith. It is necessary to be able to identify the volume serial (VOLSER) information from either density track systems on either track system. The difficulty arises when a 36-track tape, with its very narrow tracks, needs to have its VOLSER information sensed by the 18-track magnetic head. Reference is made to the aforementioned tape volume label standards for a more complete description of the accessibility byte and the label level standards section. The description of the present invention proceeds with the description of the advantages of the features now included in the VOLSER and the termination symbol sections.

Figure 5:
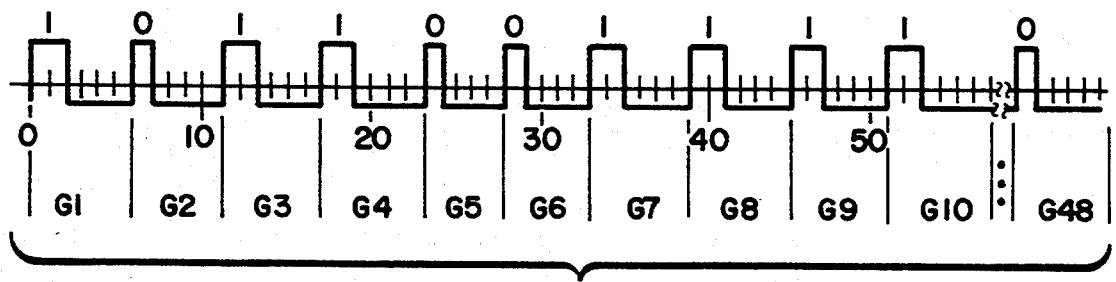
FIG. 5 shows an encoding of a serial number according to the flow chart of FIG. 4.
Figures 4, 7B:
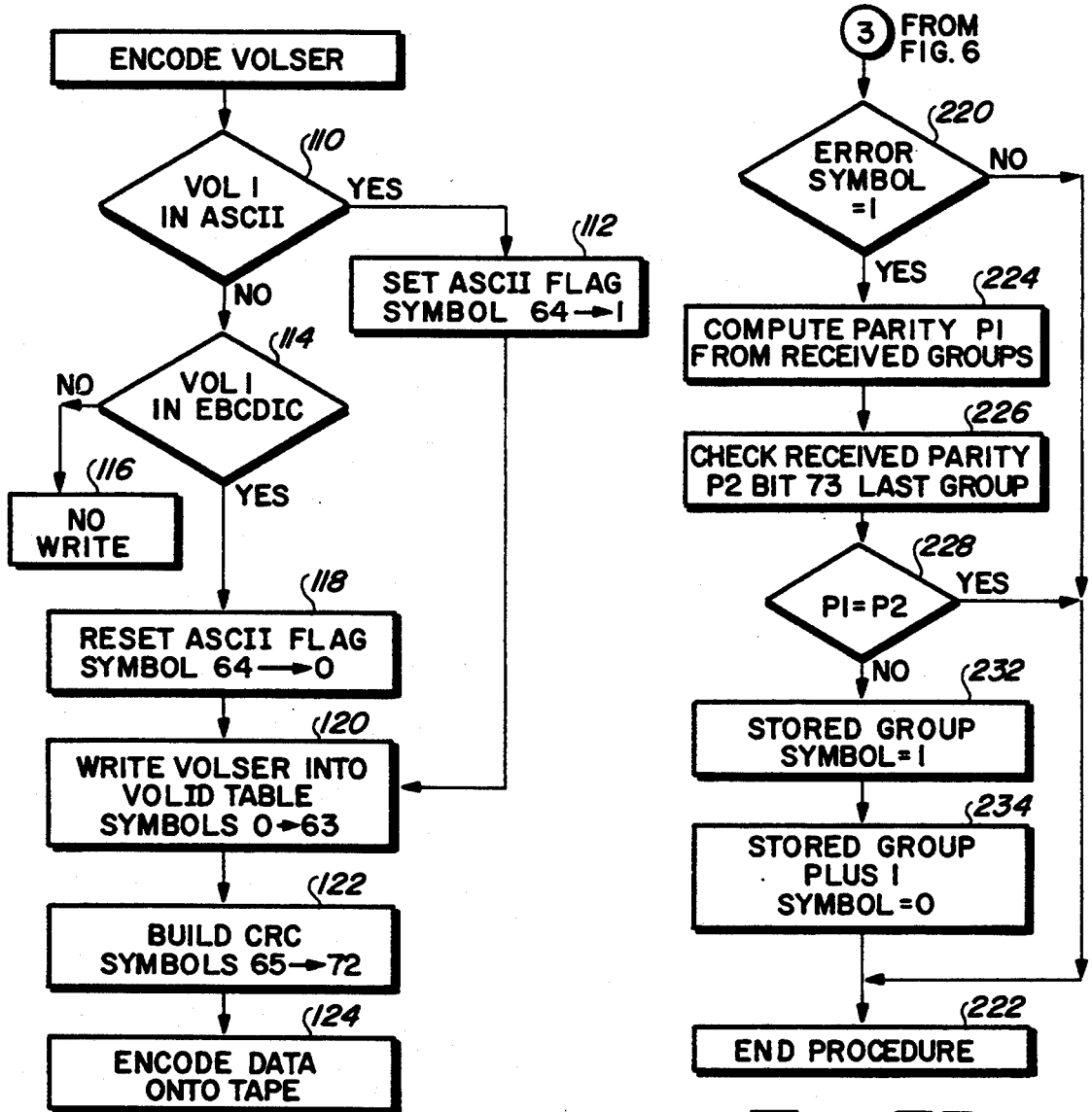
FIG. 4 shows a flow chart for the encoding of a serial number in the section of tape shown in FIG. 3C.
FIGS. 7A and 7B show a flow chart for the decoding of the serial number according to an error correction procedure from FIG. 6.

The encoding of the VOLSER information for the host is shown in the flow chart of FIG. 4. The machine executed procedure starts by checking whether VOL1 is encoded in ASCII as shown in a decision block 110. If it is, the procedure continues from the yes Y line from the decision block 110 to set the ASCII flag equal to a one "1" symbol (see FIG. 3C), as is shown in block 112. The no N decision line from decision block 110 goes to a decision block 114 where the procedure checks whether VOL1 is instead encoded in EBCDIC. If VOL1 is not encoded in either ASCII or EBCDIC, the no N line is taken from block 114 to show that a VOLID region will not be written on this tape, as is shown in block 116. If the VOL1 information is encoded in EBCDIC rather than ASCII, the ASCII flag symbol 64 is set to a zero "0" symbol, as is shown in block 118. The procedure continues to write the VOLSER information into a VOLID table in memory using symbols 0-63, as is shown in block 120. The pattern used is shown in FIG. 5 and will be discussed with that figure. The encoding procedure continues in block 122 where the error checking symbols of the CRC system are built and occupy symbols 65 to 72 (see FIG. 3C). The data information to be placed on the tape is encoded next, as shown in block 124.

Figure 6:
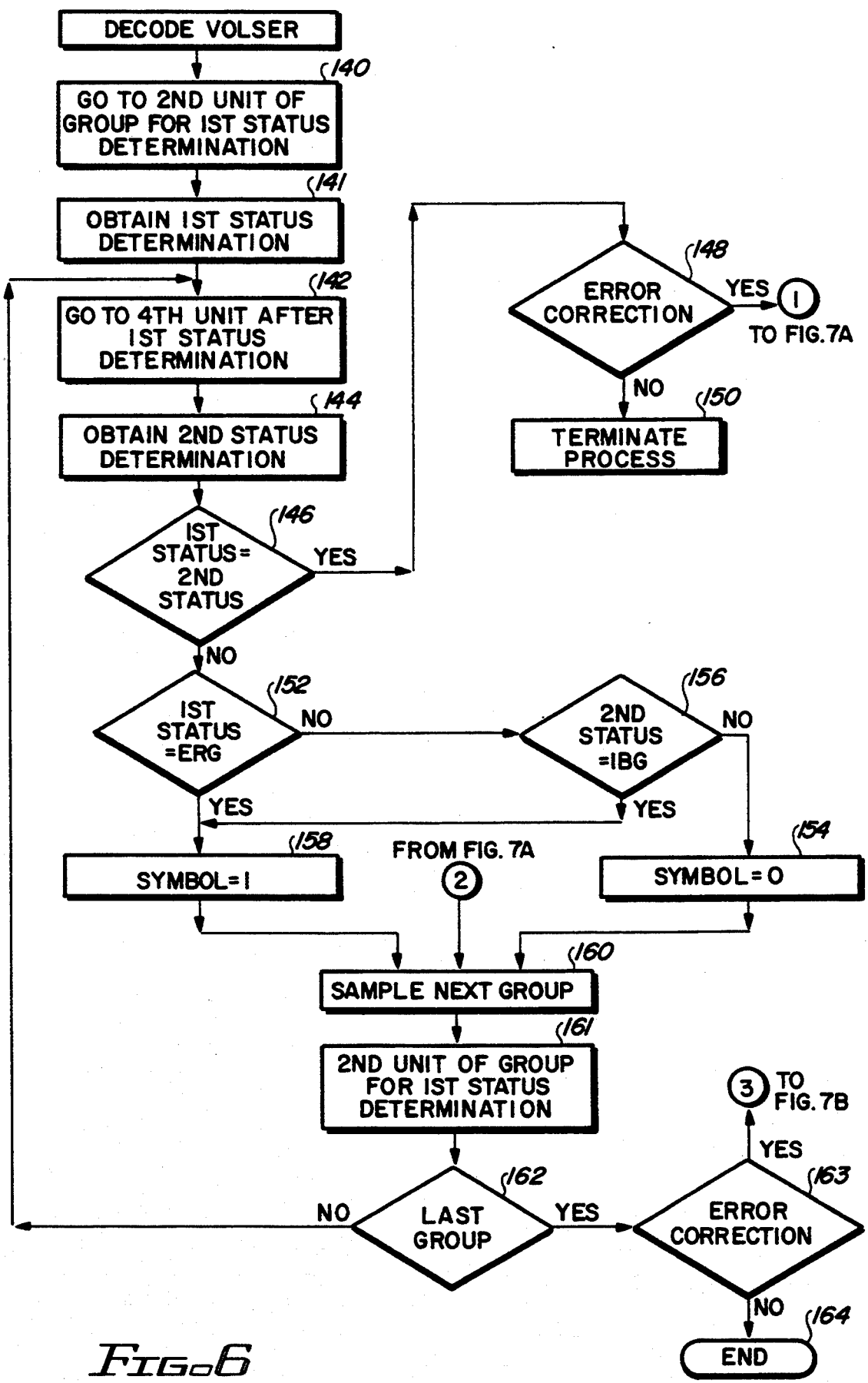
FIG. 6 shows a flow chart for the decoding of the serial number in the section of tape as encoded in FIG. 4.

The importance of this invention is shown in the format that the VOLSER information is recorded on the tape. The format is symbolically shown in FIG. 5. The value of the format encoded will be evident when the decoding procedures of FIGS. 6 and 7 are discussed. The pattern shown is 1011001111 for the first ten symbols of the 48 symbol VOLSER. The VOLSER is a variable length identifier signal in that the symbols for "1" and "0" cover different numbers of units, thus, the number of units covered by the 48 symbols varies with the mix of the ones and zeros.

Referring now to FIG. 5, a variable length symbol code group volume serial number VOLSER of the Volume ID (VOLID) is encoded with a one ("1") being symbolically represented as a high level covering a first two units of a group, that is, a one is represented as two units of an erase gap signal ERG, and a zero ("0") is represented as a high level signal covering a first one unit of a group, that is, a zero is represented as one unit of an ERG. The symbols, whether a one or a zero, are separated by an Inter Block Gap (IBG) signal which is symbolically shown as a low level covering four units of the VOLSER group. The high level and low level signal represented in FIG. 5 are, in actuality, tones recorded. As stated previously, the even tracks are not used in the VOLID region and are written with a high frequency signal that causes erasure of even tracks so that when the 18-track drive reads the 36-track drive, it senses the data on the odd tracks only. The odd tracks are used in encoding the VOLSER. The 18 odd tracks of the 36 tracks are divided in six groups of three tracks each when the VOLSER is recorded. The ERG and IBG symbols are represented by different active tones in the different groups. For instance, the IBG mark is an inactive tone in zones A, D and F, and an active tone in zones B, C and E. The ERG mark is represented by an active tone for zones A, D and E. Zone A covers tracks 1, 13 and 25, for instance. Zone B covers tracks 3, 15 and 27. The other zones cover other tracks. The tracks covered by each zone does not form a part of this invention and, thus, will not be completely described herein. The information is given to show the implementation in an IBM 3490E Tape Drive.

In FIG. 5, one symbol appears in one group of units. The first symbol is a "1" and, therefore, a first group G1 covers six units, two units of an ERG signal shown as a high level in FIG. 5, and four units of an IBG signal shown as a low level. The second group is a "0" and, therefore, a second group G2 covers five units, one unit of an ERG signal followed by four units of an IBG signal. All of the groups, G1 to G10, cover a variable number of units depending upon the symbols of the VOLSER.

The first embodiment of the decode procedure for decoding the VOLSER signal is shown in FIG. 6. The first step in the decode procedure, as shown in block 140, is to sample the second unit of the group for a first status determination. The first status determination is then obtained, as shown in a block 141. The next step, as shown in block 142, is to sample the fourth unit after the first status determination. Next, in block 144, the second status determination is obtained. A decision block 146 then seeks whether the first status is equal to the second status determination. If the first and second status are both equal to an IBG, or both are equal to an ERG, or both are equal to an indeterminate status; i.e., cannot be sensed correctly, an error has occurred. If an error correction is included, as will be discussed in FIGS. 7A and 7B for the second embodiment, a decision block 148 will be included and the process will continue on the flow diagram of FIG. 7A. The embodiment of FIGS. 7A and 7B will be discussed later and, therefore, for purposes of this embodiment, the occurrence of an error will terminate the process as is shown in block 150.

If the first status determination is not equal to the second status determination, the flow continues to a decision block 152 where it is determined whether the first status is equal to an ERG. If it is not, the first status is either an IBG or is an indeterminate status. The no N line from decision block 152 takes the flow procedure to the decision block 156. In block 156, the determination is made whether the second status is equal to an IBG or not. If the second status is not an IBG, i.e. is either an ERG or an indeterminate status, then the symbol is determined or corrected to be a "0," as is shown by the flow taking the no line from the decision block to a block 154. The flow continues to a block 160 for the sampling of the next group, as will be discussed later.

Figure 7A:
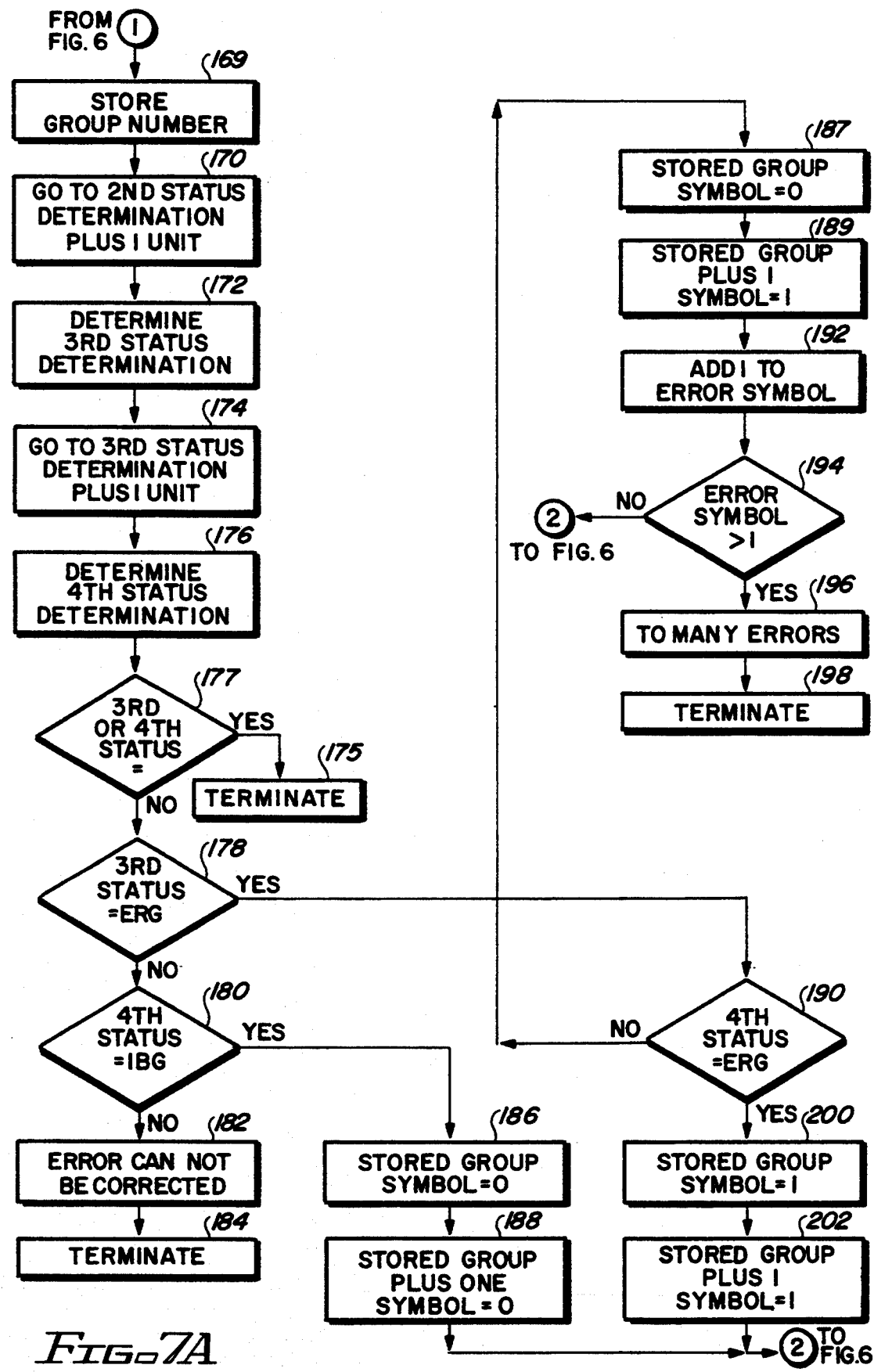

If the first status sensed is an ERG, the yes line Y is taken from the decision block 152 to a block 158 where the symbol is determined to be a "1." If the second status is an IBG, and the first status was an indeterminate status, i.e., not an ERG, as is shown from the no line of decision block 152, then the symbol must be a "1," as is shown from the yes line of the decision block 156 to the block 158. From the block 158, the flow continues to the block 160 where the next group unit is sampled. The next group starts after the ending of the IBG signal which, after a symbol equal to a one determination, is at the seventh unit. Two units are added and the first status determination is made for the next group, as is shown in block 161. The flow continues to a decision block 162 where the presence of the last group is determined. If this is the last symbol to be determined and there is no error correction procedure, i.e., no second embodiment of FIGS. 7A and 7B, the decode will end the procedure, as is shown in a block 164. If the second embodiment of FIGS. 7A and 7B is included, a decision block 163 will be included in the flow to carry the flow out a bubble 3 to FIG. 7B, as will be discussed later. If it is not the last symbol to be determined, the flow continues from the decision block 162 to the block 142 for the second status determination of the next group.

As discussed previously, if the symbol "0" is determined, the flow from the block 154 will be to the block 160. In block 160, after a "0" symbol is sensed, the next group of units will start at the sixth unit so one unit must be added and the first status determination made for the next group, as is shown in a block 161. The flow then continues to the decision block 162 for either the return to the block 142, if more symbols are to be sensed, or to the block 164 to end the decode procedure unless the error correction procedure of FIG. 7B is included as determined in the decision block 163.

Using the symbols of the VOLSER, as shown in FIG. 5 in the decode procedure of FIG. 6, the first status determination of blocks 140 and 141 will find an ERG status at unit 2. At the fourth unit after the first status determination, as shown in blocks 142 and 144, the sixth unit status is an IBG status, a low level shown at unit six in FIG. 5. The first status is not equal to the second status, so no error is detected in the decision block 146 and the no line is taken to decision block 152. The first status is an ERG signal, so the yes line is taken to the block 158. The block 158 shows that the symbol sensed is a one "1" symbol. The process continues to the block 160 where the next group G2 symbol is to be determined. Two units are added to the sixth unit which was sensed for the second status determination since an ERG status was found at the second unit of the group. The first status determination of an IBG is made on the eighth unit, see FIG 5, as is shown in the block 161. This is not the last group, so the no line is taken from the decision block to the block 142.

The fourth unit after the eighth unit, the twelfth unit, is sensed as shown in block 142 and the second status determination is an ERG signal, see FIG. 5, for the block 144. No error has occurred since the first status is not equal to the second status, as is determined in the decision block 146. The first status is not an ERG signal, so the no line is taken from the decision block 152 to the decision block 156 where whether the second status determination is equal to IBG is questioned. The second status has been determined to be an ERG, so the no line is taken from the decision block 156 to the block 154 which shows that a "0" symbol has been determined to be the symbol of the second group, group G2. The flow continues to the block 160 where the next group, G3, is sampled by sampling the first status determination of the plus one unit or the thirteenth unit of FIG. 5. The thirteenth unit, the second unit of group G3, is an ERG status, see FIG. 5. Again, this is not the last group and the procedure continues from the decision block 162 to the block 142 to sample the fourth unit of group G3 after the second unit of group G3, which is the seventeenth unit. The seventeenth unit has an IBG status. The procedure continues until the last group, G48, is sampled and the decision block 162 yes line is taken to the block 164; i.e., no correction procedure of FIGS. 7A and 7B is present to end the decode process.

It should be evident that any other number of groups could be included for the VOLSER representation shown in FIG 5. A lesser number of groups would occur for a lesser number of symbols in the VOLSER.

More units could be added to create more groups and thereby increase the number of symbols in the VOLSER. The number shown in FIG. 5 should not be taken as a limitation of the VOLSER symbols.

The decode embodiment of FIG. 6 includes some error correction, as is discussed. The addition of the embodiment of FIGS. 7A and 7B corrects the errors when the first and second status determinations of one group are equal. The addition of the error correction is shown in the decision blocks 148 and 163 of FIG. 6. If the embodiment of FIGS. 7A and 7B is included, the yes line will be taken from the decision block 148 to a number 1 bubble on FIG. 7A. The number 1 bubble from FIG. 6 leads to a first block 169 on FIG 7A. First the group number under consideration for the correction of an error is stored, as is shown in the block 169. The flow then continues to a block 170.

The block 170 states that the unit of the second status determination plus one should be sampled as shown in a block 172 where a third status determination is made. The second status determination of the first group, G1, is at unit six. Thus, the third status determination for group G1 is at unit seven. The third status determination unit plus one is then sensed in a block 174 and a fourth status determination of unit eight is done as called for in a block 176. If the third or the fourth status determination is indeterminate (?), as shown in a decision block 177, the procedure terminates as is shown by taking the yes line from the decision block 177 to a block 175. The error cannot be corrected. If neither the third nor the fourth status determinations are indeterminate, the no line from the decision block 177 continues the flow to a decision block 178. If the third status determination is an IBG, the decision block 178 leads the flow from the no line to a decision block 180. Then, if the fourth status is an ERG, the no line from the decision block 180 leads to a block 182 where the flow shows that this status sequence cannot be corrected and the flow continues to a block 184 where the process is terminated because the error cannot be corrected by this sequence.

If, however, the fourth status is determined to be an IBG, the flow from the decision block 180 is from the yes line to a block 186 where the stored group symbol is determined to be a "0" symbol. Since the third status has already been determined through this flow, the third status being the status of the second group which is the group following the error group, the status of the second symbol is already determined to also be a "0" symbol, as shown in a block 188. From the block 188, the flow continues to a second bubble, bubble 2, which returns the flow back to the block 166 of FIG. 6 where the next, or third, group status is sampled by going to the group following the stored group plus one unit for the first status determination of the third group, as is shown in the blocks 160 and 161. The procedure of FIG. 7A has performed a correction of the error and the flow of FIG. 6 can be continued for the remaining symbols of the VOLSER.

The discussion of the error correction procedure of FIG 7A continues in the decision block 178 for the determination if the third status is equal to ERG. If the third status determination is an ERG, the yes line is taken from the decision block 178 to a decision block 190 where the fourth status is questioned. If the fourth status is an IBG after the third status was determined to be an ERG, the no line is taken. The no line leads the flow to a block 187 where the stored group symbol is assumed to be a zero "0," as shown in the block 187, and the stored group plus one symbol is assumed to be a one "1," as is shown in a block 189. The symbols are set to the determination, as shown in blocks 187 and 189, because the parity status will be checked later and if the assumption is incorrect, the symbols will be reversed since the parity will show that the assumption was incorrect and the opposite is in fact correct. This parity check is shown in FIG. 7B and will be discussed later. The group number of the stored group and the stored group plus one will be the groups that have their symbols reversed. A one is added to the error signal, as shown in a block 192. The flow continues to a decision block 194 which determines whether more than one such error has been corrected. If so, the yes line is taken to a block 196 where too many errors have occurred, i.e., more than one, and the procedure is terminated, as shown in block 198. If more than one error is sensed in the decode procedure, the reading of the VOLSER cannot be determined to be reliable and any further decoding may lead to an incorrect VOLSER.

The yes line from the decision block 190 is the determination that the fourth status is an ERG. The yes line goes to a block 200 and a block 202 where the first and third status determination are found to be ERGs and, thus, the symbols of the first stored group and the group following the stored group are both a "1." The flow continues out the bubble 2 to the block 160 of FIG. 6. The block 160 provides for the sampling of the next group of units and the block 161 determines the first status determination of the second unit of the next group.

The no line from the decision block 194 also leads to the bubble 2 which continues the flow to the decision block 160 of FIG. 6. The decision block 160 determines whether the last group is having its status determined and ends the procedure if it is, or returns the procedure to the block 142 to sample the status of the next group of units. The last group, group G48 of FIG. 5, cannot be corrected using the flow procedure of FIGS. 7A and 7B since there is no "group following the stored group" to assist in the correction process as is necessary in the flow procedure shown in FIGS. 7A and 7B. This can be solved, as will be discussed later, by adding another group of units, not for its symbol, but to assist only in the correction procedure.

Referring now to FIG. 6, after the last group has its symbol determined by the flow shown in FIG. 6 and the embodiment of FIGS. 7A and 7B are included, the decision block 162 determines that this is the last group and the yes line takes the flow to the decision block 163. If the error correction procedure of FIGS. 7A and 7B are included in the subsystem, the flow continues out of FIG. 6 to the bubble 3 of FIG. 7B.

Referring now to FIG. 7B, the flow continues from the decision block 163 of FIG. 6 to a decision block 220 where the flow checks whether an error symbol was checked using the procedure of FIG. 7A. If there is no error symbol, i.e., the error symbol is zero, the no line from the decision block 220 goes to a block 222 to end the procedure. If there has been one and only one error corrected, the yes line from block 220 takes the flow to a block 224 to compute a parity P1 from the received, that is, just read, groups of units. The symbols of the odd groups are used to compute the received parity P1. A block 226 then checks the parity that accompanied the received groups, a received parity P2, the parity in symbol 64. The flow continues to a decision block 228 where P1 is checked for its status relative to P2. If P1 is equal to P2, then the symbols found in the correction procedure for the stored group and the stored group plus one are correct, the stored group symbol is equal to "0" and the stored group plus one, the group following the stored group, symbol is equal to "1." The yes line is taken from the decision block 228 to end the procedure, as is shown in the block 222.

If the parity status of P1 is not found to be equal to that of P2, the no line is taken in the flow from the decision block 228 to a block 232 where the stored group symbol is reversed and set equal to a "1" and then to a block 234 where the stored group plus one symbol is also reversed and set equal to a "0." The procedure then ends, as is shown in the block 222. The symbols are reversed because the procedure of FIG. 7A made an incorrect assumption and the status of the parity read, as compared to the status of the parity accompanying the symbols, should be that the opposite symbols are the correct symbols because the opposite symbols would make the parity of both P1 and P2 the same.

A decoding table of the nine possibilities that arise from the decoding procedure of FIG. 6, FIGS. 7A and 7B will now be discussed. The output symbols, as a result of the sampling of units two and six of the first group G1, are equally applicable to the second and sixth units of any succeeding group (see FIG. 5). If the status of the first status determination of the procedure of FIG. 6 is determined to be an ERG status, then whether the status of the second status determination of FIG. 6 is an IBG status or an indeterminate status, i.e., cannot be read, then the output symbol is a "1." If the status of the first status determination is indeterminate, but the status of the second determination is an IBG, then the output symbol is also a "1." If the first status determination is an IBG status, the output symbol is a "0" whether the second status is determined to be an ERG status or an indeterminate status. If the first status determination is indeterminate, but the second status determination is found to be an ERG status, then the output symbol is a "0." As stated in the description of FIG. 6, if the first and second status determinations are the same, the outcome of the embodiment of FIG. 6 is indeterminate. However, using the error correction procedure of FIGS. 7A and 7B, the third and fourth status determinations of succeeding units of the next group can provide outputs of all but one status reading by sampling the status of the following group. The output of the decoding procedure of FIGS. 7A and 7B uses the status determinations of the group following the group where the error is detected to correct the error and also determine the status of the following group. The group number of the group that has the error is stored. If the third and fourth status determinations are both ERG status, then the output symbol of the stored group is a "1" as is also the output of the group following the stored group. If the third and fourth status determinations are both an IBG status, then both the stored group and the group following the stored group have output symbols equal to "0." If the third status determination is an ERG status and the fourth status is an IBG, then the output symbol is first assumed to be a "0" for the stored group and the group after the stored group is assumed to be a "0." The final symbol of the stored group, and its group following the stored group, is determined by the status of the parity symbol which is the required extra symbol for the error correction procedure of FIG. 7B.

The parity system reads all of the ERG status of the odd groups of the VOLSER. The parity system adds a one if the count is odd and a zero if the count is even. If the computed parity count P1 is the same as the received parity P2, the symbol output of the first stored group is a "0" and the symbol of the group following the stored group is a "1." The symbol outputs are reversed if the parity found in the count, as read in the decoding, is not the same as that stored from the encoding of the VOLSER and stored in the symbol 64. If the third status determination is an IBG and the fourth status determination is an ERG, then the output is not correctable and decoding must be terminated.

Even when multiple errors occur, error detection is still possible because the code of the present invention is of a variable length. The only exception is that the procedure is terminated when a second error occurs of the type where the status determinations are equal; i.e., the error as determined in the decision block 146 of FIG. 6. A serial number generally includes a fixed number of symbols and the subsystem can count the number of symbols read and compare with the number of symbols of the recorded serial number. The present invention provides a format that produces a reliable serial number decoding together with error detection and correction.

There is an encoding dependency for the error correction decode of the embodiment shown in FIGS. 7A and 7B. The last group with the encoded symbol is not correctable, refer to the symbolic encoding of a VOLSER, as is shown in FIG. 5. If an error occurs in the last group, there is no further group to be used in the correction procedure of FIGS 7A and 7B. If an error occurs, for instance, in group G48 of FIG. 5, there is no "group G49" to assist in the correction of the error in group G48. To solve this, a boundary group (group G49) can be added having a known symbol, either a one or a zero. Then the error correction procedure of FIGS. 7A and 7B can be entered to correct the group G48 error. In this instance, the error correction can occur over the entire data stream. The symbol of the last group, group G48, for instance, could be repeated in the boundary group, group G49.

While the invention has been described with respect to a preferred embodiment thereof, it will be understood by those skilled in the art that various changes in detail may be made therein without departing from the spirit, scope, and teaching of the invention. For example, the invention has been described for use in a magnetic tape system, but could be embodied in any applicable peripheral storage system employing removable, multitrack, sequentially recorded storage media. Also, different types of FIDs, VOLSERs, transducers, recording formats, means for determining the characteristics of the storage media, etc. may be used. Accordingly, the invention disclosed herein is to be limited only as specified in the following claims.

What is claimed is:

1. A peripheral storage system for reading data on a removable data storage medium mounted therein, the data perhaps in a format not easily read, the data storage medium having an identification of the data stored on the medium in one of a plurality of locations thereon, the system comprising:

a transducing head;

means for moving the data storage medium relative to the transducing head;

means for controlling the transducing head to read the data on the data storage medium; and means for determining the identification of the data by sensing the identification encoded on said medium, said identification including a plurality of units in a group with each group identifying a symbol and a "one" being represented as a first special signal covering the first two units of the group, and a "zero" being represented as the first special signal covering the first one unit of the group, both followed by a second special signal which covers four units of the group;

wherein the "one" is represented as a "high level" or ERase Gap (ERG) signal covering the first two units of the group, that is, the "one" is represented as two units of the "high level" signal, and the "zero" is represented as one unit of the "high level" signal covering the first unit of the group, that is, the "zero" is represented as one unit of the ERG, with the symbols, whether a one or a zero, being separated by an Inter Block Gap (IBG) signal which is a "low level" IBG signal covering four units of the group.

2. A system as defined in claim 1 wherein the determining means senses a following group of the identification with the first two units following the second special signal representing a "one" if both units include the first special signal and a "zero" if only the first unit following the second special signal includes the first special signal.

3. The system of claim 2 wherein the identification includes a plurality of groups each having a symbol.

4. The system of claim 1 wherein the means for controlling the transducing head to read the data employs a sequential access method.

5. The system of claim 1 further including means for determining the format used to record the data and wherein the data storage medium is a tape medium.

6. A peripheral storage system for reading data on a removable data storage medium mounted therein, the data perhaps in a format not easily read, the data storage medium having an identification of the data stored on the medium in one of a plurality of locations thereon, the system comprising:

a transducing head;

means for moving the data storage medium relative to the transducing head;

means for controlling the transducing head to read the data on the data storage medium; and means for determining the identification of the data by sensing the identification encoded on said medium, said identification including a plurality of units in a group and each group including a symbol with a "one" being represented as an ERase Gap (ERG) signal covering the first two units of a group, and a "zero" being represented as the ERG signal covering the first one unit of the group, both followed by an Inter Block Gap (IBG) signal covering four units of the group;

wherein the "one" is represented as a "high level" or ERG signal covering the first two units of the group, that is, the "one" is represented as two units of the "high level" signal, and the "zero" is represented as one unit of the "high level" signal covering the first unit of the group, that is, the "zero" is represented as one unit of the ERG, with the symbols, whether a one or a zero, being separated by an IBG signal which is a "low level" IBG signal covering four units of the group.

7. The system of claim 6 wherein the means for controlling the transducing head to read the data employs a sequential access method.

8. A system as defined in claim 6 wherein the determining means senses a following group of the identification with the first two units following the IBG signal representing a "one" if both units include the ERG signal and a "zero" if only the first unit following the IBG signal includes the ERG signal.

9. The system of claim 8 wherein the identification includes a plurality of groups each having a symbol.

10. The system of claim 6 further including means for determining the format used to record the data and wherein the data storage medium is a tape medium.

11. A peripheral storage system for encoding an identification of the data stored on the medium in one of a plurality of locations on a removable data storage medium mounted therein, the data perhaps in a format not easily read, the system comprising:

a transducing head;

means for moving the data storage medium relative to the transducing head; and means for controlling the transducing head to record the identification of the data on the data storage medium;

said identification signal including a plurality of units with a "one" being represented as an ERase Gap (ERG) signal covering the first two units of the group, and a "zero" being represented as the ERG signal covering the first one unit of the group, both followed by an Inter Block Gap (IBG) signal covering four units followed by a repeat with the first two units following the IBG signal representing a "one" if both are the ERG signal, and a "zero" if only the first unit following the IBG signal is the ERG signal;

wherein the "one" is represented as a "high level" or ERG signal covering the first two units of the group, that is, the "one" is represented as two units of the "high level" signal, and the "zero" is represented as one unit of the "high level" signal covering the first unit of the group, that is, the "zero" is represented as one unit of the ERG, with the symbols, whether a one or a zero, being separated by an IBG signal which is a "low level" IBG signal covering four units of the group.

12. A peripheral storage system for encoding an identification of the data stored on the medium in one of a plurality of locations on a removable data storage medium mounted therein, the data perhaps in a format not easily read, the system comprising:

a transducing head;

means for moving the data storage medium relative to the transducing head; and means for controlling the transducing head to record the identification of the data on the data storage medium;

said identification signal including a plurality of units with a "one" being represented as a first special signal covering the first two units of the group, and a "zero" being represented as the first special signal covering the first one unit of the group, both followed by a second special signal which covers four units followed by a repeat with the first two units following the second special signal representing a "one" if both units include the first special signal and a "zero" if only the first unit following the second special signal includes the first special signal;

wherein the "one" is represented as a "high level" or ERase Gap (ERG) signal covering the first two units of the group, that is, the "one" is represented as two units of the "high level" signal, and the "zero" is represented as one unit of the "high level" signal covering the first unit of the group, that is, the "zero" is represented as one unit of the ERG, with the symbols, whether a one or a zero, being separated by an Inter Block Gap (IBG) signal which is a "low level" IBG signal covering four units of the group.

13. A machine executable process comprising the steps of:

encoding an identification signal on a media representative of the data stored on the media, the data perhaps in a format not easily read, said identification signal including a plurality of units with a "one" being represented as a first special signal covering the first two units of the group, and a "zero" being represented as the first special signal covering the first one unit of the group, both followed by a second special signal which covers four units followed by a repeat with the first two units following the second special signal representing a "one" if both units include the first special signal and a "zero" if only the first unit following the second special signal includes the first special signal;

sampling a first status of the second unit of the group from said identification signal;

sampling a second status of the unit located four units following the second unit of the group; and decoding a symbol of the group using the first status and the second status;

wherein the "one" is represented as a "high level" or ERase Gap (ERG) signal covering the first two units of the group, that is, the "one" is represented as two units of the "high level" signal, and the "zero" is represented as one unit of the "high level" signal covering the first unit of the group, that is, the "zero" is represented as one unit of the ERG, with the symbols, whether a one or a zero, being separated by an Inter Block Gap (IBG) signal which is a "low level" IBG signal covering four units of the group.

14. A machine executable process as defined in claim 13 further including the step of preparing for the sampling of a symbol from a succeeding group by adding two units to the unit sampled for the second status of the preceding group if the symbol sampled in the preceding group is the "1" symbol, or, adding one unit to the unit sampled for the second status of the preceding group if the symbol sampled in the preceding group is the "0" symbol.

15. A machine executable process as defined in claim 14 further including the steps of:

sampling the first status of the second unit of a succeeding group from said identification signal;

sampling a second status of a unit located four units following the second unit of the succeeding group; and decoding a symbol of the succeeding group using the first status and the second status sampled from the succeeding group.

16. A machine executable process as defined in claim 13 further including, after the sampling step to obtain the second status, the step of determining whether an error occurred because the first status is equal to the second status, and if they are, terminating the process.

17. A machine executable process as defined in claim 13 further including, after the sampling step to obtain the second status, the step of determining whether the first status is equal to the second status, and if they are, storing a group number of the group where the first status is equal to the second status and sampling the status of the first and second units of the following group to determine the symbols of the stored group and the group following the stored group.

18. A machine executable process as defined in claim 17 wherein if the third and fourth status sampled the second special signal, the process is terminated and the symbols of the stored group and the next group to the stored group are not determined.

19. A machine executable process as defined in claim 17 wherein the stored group symbol is assumed to have a "0" symbol and the group following the stored group is assumed to have a "1" symbol if the third status is found to include the first special signal, and the fourth status is found to include the second special signal.

20. A machine executable process as defined in claim 13 further including the step of encoding a parity symbol with the encoding of the identification signal, the parity sampling the symbols of the odd groups of the identification signal.

21. A machine executable process as defined in claim 20 further including the steps of:

determining whether the first status has been determined to be equal to the second status in a proceeding step;

computing a parity from the symbols of the odd groups read by the transducer head;

determining whether the computed parity is equal to the encoded parity; and terminating the process if the computed parity is equal to the encoded parity, otherwise setting the stored group symbol equal to a "1" symbol and setting the symbol of the group following the stored group equal to a "0."

22. A media format for encoding an identifier for a volume of information recorded on the media, the identifier perhaps in a format not easily read, said format being capable of error detection and correction comprising a plurality of units in a group with each group identifying a symbol and a "one" being represented as a first special signal covering the first two units of the group, and a "zero" being represented as the first special signal covering the first one unit of the group, both followed by a second special signal which covers four units of the group, wherein the "one" is represented as a "high level" or ERase Gap (ERG) signal covering the first two units of the group, that is, the "one" is represented as two units of the "high level" signal, and the "zero" is represented as one unit of the "high level" signal covering the first unit of the group, that is, the "zero" is represented as one unit of the ERG, with the symbols, whether a one or a zero, being separated by an Inter Block Gap (IBG) signal which is a "low level" IBG signal covering four units of the group.

23. A media format as defined in claim 22 further including a second group with the first two units following the second special signal representing a "one" if both units include the first special signal and a "zero" if only the first unit following the second special signal includes the first special signal.

24. The media format as defined in claim 22 wherein the identifier includes a plurality of groups each having a symbol.

25. A media format for encoding an identifier for a volume of information recorded on the media, the identifier perhaps in a format not easily read, said format being capable of error detection and correction comprising a plurality of units in a group with each group identifying a symbol and a "one" being represented as an ERase Gap (ERG) signal covering the first two units of the group, and a "zero" being represented as an ERG signal covering the first one unit of the group, both followed by an Inter Block Gap (IBG) signal covering four units of the group, wherein the "one" is represented as a "high level" or ERG signal covering the first two units of the group, that is, the "one" is represented as two units of the "high level" signal, and the "zero" is represented as one unit of the "high level" signal covering the first unit of the group, that is, the "zero" is represented as one unit of the ERG, with the symbols, whether a one or a zero, being separated by an IBG signal which is a "low level" IBG signal covering four units of the group.

26. A media format as defined in claim 25 further including a second group with the first two units following the IBG signal representing a "one" if both units include the ERG signal and a "zero" if only the first unit following the IBG signal includes the ERG signal.

27. A method for controlling a data processing system for the encoding of an identifier for a volume of information stored on a media, the identifier perhaps in a format not easily read, comprising the steps of:

encoding the identifier on a media representative of the data stored on the media, said identifier including a plurality of units with a "one" being represented as a first special signal covering the first two units of a group, and a "zero" being represented as the first special signal covering the first one unit of the group, both followed by a second special signal which covers four units followed by a repeat with the first two units following the second special signal representing a "one" if both units include the first special signal and a "zero" if only the first unit following the second special signal includes the first special signal;

sampling a first status of the second unit of the group from said identification signal;

sampling a second status of a unit four units following the second unit of the group; and decoding a symbol of the group using the first status and the second status;

wherein the "one" is represented as a "high level" or ERase Gap (ERG) signal covering the first two units of the group, that is, the "one" is represented as two units of the "high level" signal, and the "zero" is represented as one unit of the "high level" signal covering the first unit of the group, that is, the "zero" is represented as one unit of the ERG, with the symbols, whether a one or a zero, being separated by an Inter Block Gap (IBG) signal which is a "low level" IBG signal covering four units of the group.

28. A method for controlling a data processing system for the encoding of an identifier for a volume of information stored on a media, the identifier perhaps in a format not easily read, comprising the step of encoding an identification signal on a media representative of the data stored on the media, said identification signal including a plurality of units with a "one" being represented as a first special signal covering the first two units of a group, and a "zero" being represented as the first special signal covering the first one unit of the group, both followed by a second special signal which covers four units, wherein the "one" is represented as a "high level" or ERase Gap (ERG) signal covering the first two units of the group, that is, the "one" is represented as two units of the "high level" signal, and the "zero" is represented as one unit of the "high level" signal covering the first unit of the group, that is, the "zero" is represented as one unit of the ERG, with the symbols, whether a one or a zero, being separated by an Inter Block Gap (IBG) signal which is a "low level" IBG signal covering four units of the group.

29. A method for controlling a data processing system for the encoding of an identifier for a volume of information stored on a media, the identifier perhaps in a format not easily read, comprising the step of encoding an identification signal on a media representative of the data stored on the media, said identification signal including a plurality of units with a "one" being represented as an ERG signal covering the first two units of a group , and a "zero" being represented as an ERase Gap (ERG) signal covering the first one unit of the group, both followed by an Inter Block Gap (IBG) signal covering four units, wherein the "one" is represented as a "high level" or ERG signal covering the first two units of the group, that is, the "one" is represented as two units of the "high level signal", and the "zero" is represented as one unit of the "high level" signal covering the first unit of the group, that is, the "zero" is represented as one unit of the ERG, with the symbols, whether a one or a zero, being separated by an Inter Block Gap (IBG) signal which is a "low level" IBG signal covering four units of the group.

30. A media format for encoding an identifier for a volume of information recorded on the media, the identifier perhaps in a format not easily read, said format being capable of error detection and correction comprising a plurality of units in a group with each group identifying a symbol and a first logical state being represented as a first special signal covering the first two units of the group, and a second logical state being represented as the first special signal covering the first one unit of the group, both followed by a second special signal which covers four units of the group, wherein the first special signal is represented as a "high level" signal and the first logical state is a first special signal covering the first two units of the group, that is, the first logical state is represented as two units of the "high level" signal, and the second logical state is represented as one unit of the first special signal covering the first unit of the group, with the states whether first or second logical states, being separated by a second special signal which is a "low level" signal covering four units of the group.

31. A media format as defined in claim 30 further including a second group with the first two units following the second special signal representing a first logical state if both units include the first special signal and a second logical state if only the first unit following the second special signal includes the first special signal.

32. The media format as defined in claim 30 wherein the identifier includes a plurality of groups each having a symbol.

33. A media format for encoding an identifier for a volume of information recorded on the media, the identifier perhaps in a format not easily read, said format being capable of error detection and correction comprising a plurality of units in a group with each group identifying a symbol and a first logical state being represented as an ERase Gap (ERG) signal covering the first two units of the group, and a second logical state being represented as an ERG signal covering the first one unit of the group, both followed by an Inter Block Gap (IBG) signal covering four units of the group, wherein the first logical state is represented as a "high level" or ERG signal covering the first two units of the group, that is, the first logical state is represented as two units of the "high level" signal, and the second logical state is represented as one unit of the "high level" signal covering the first unit of the group, that is, the second logical state is represented as one unit of the ERG, with the symbols, whether a one or a zero, being separated by an IBG signal which is a "low level" signal covering four units of the group.

34. A media format as defined in claim 33 further including a second group with the first two units following the IBG signal representing the first logical state if both units include the ERase Gap (ERG) signal and the second logical state if only the first unit following the IBG signal includes the ERase Gap (ERG) signal.

35. A method for controlling a data processing system for the encoding of an identifier for a volume of information stored on a media, the identifier perhaps in a format not easily read, comprising the steps of:
encoding the identifier on a media representative of the data stored on the media, said identifier including a plurality of units with a first logical state being represented as a first special signal covering the first two units of a group, and a second logical state being represented as the first special signal covering the first one unit of the group, both followed by a second special signal which covers four units followed by a repeat with the first two units following the second special signal representing the first logical state if both units include the first special signal and the second logical state if only the first unit following the second special signal includes the first special signal;
sampling a first status of the second unit of the group from said identification signal;
sampling a second status of a unit four units following the second unit of the group; and
decoding a symbol of the group using the first status and the second status;
wherein the first special signal is represented as a "high level" signal and the first logical state is a first special signal covering the first two units of the group, that is, the first logical state is represented as two units of the "high level" signal, and the second logical state is represented as one unit of the first special signal covering the first unit of the group, with the states whether first or second logical states, being separated by a second special signal which is a "low level" signal covering four units of the group.

36. A method for controlling a data processing system for the encoding of an identifier for a volume of information stored on a media, the identifier perhaps in a format not easily read, comprising the step of encoding an identification signal on a media representative of the data stored on the media, said identification signal including a plurality of units with a first logical state being represented as a first special signal covering the first two units of a group, and a second logical state being represented as the first special signal covering the first one unit of the group, both followed by a second special signal which covers four units, wherein the first special signal is represented as a "high level" signal and the first logical state is a first special signal covering the first two units of the group, that is, the first logical state is represented as two units of the "high level" signal, and the second logical state is represented as one unit of the first special signal covering the first unit of the group, with the states whether first or second logical states, being separated by a second special signal which is a "low level" signal covering four units of the group.

37. A method for controlling a data processing system for the encoding of an identifier for a volume of information stored on a media, the identifier perhaps in a format not easily read, comprising the step of encoding an identification signal on a media representative of the data stored on the media, said identification signal including a plurality of units with a first logical state being represented as an ERase Gap (ERG) signal covering the first two units of a group, and a second logical state being represented as an ERG signal covering the first one unit of the group, both followed by an Inter Block Gap (IBG) signal covering four units, wherein the ERG signal is represented as a "high level" signal and the first logical state is an ERG signal covering the first two units of the group, that is, the first logical state is represented as two units of the "high level" signal, and the second logical state is represented as one unit of the ERG signal covering the first unit of the group, with the states whether first or second logical states, being separated by the IBG signal which is a "low level" signal covering four units of the group.

38. A peripheral storage system for reading data on a removable data storage medium mounted therein, the data storage medium having a critical subset of data stored on the medium in one of a plurality of locations thereon, the data perhaps in a format not easily read, the system comprising:
a transducing head;
means for moving the data storage medium relative to the transducing head;
means for controlling the transducing head to read the data on the data storage medium; and
means for determining the critical subset of data by sensing the critical subset of data encoded on said medium, said critical subset of data including a plurality of units in a group with each group identifying a symbol and a first logical state being represented as a first special signal covering the first two units of the group, and a second logical state being represented as the first special signal covering the first one unit of the group, both followed by a second special signal which covers four units of the group;
wherein the first special signal is represented as a "high level" signal and the first logical state is a first special signal covering the first two units of the group, that is, the first logical state is represented as two units of the "high level" signal, and the second logical state is represented as one unit of the first special signal covering the first unit of the group, with the states whether first or second logical states, being separated by a second special signal which is a "low level" signal covering four units of the group.

39. The system of claim 38 wherein the critical subset of data includes a plurality of groups each having a symbol.

40. A machine executable process comprising the steps of:

encoding a critical subset of data on a media, the data perhaps in a format not easily read, said critical subset of data including a plurality of units with a first logical state being represented as a first special signal covering the first two units of the group, and a second logical state being represented as the first special signal covering the first one unit of the group, both followed by a second special signal which covers four units followed by a repeat with the first two units following the second special signal representing the first logical state if both units include the first special signal and the second logical state if only the first unit following the second special signal includes the first special signal;

sampling a first status of the second unit of the group from said identification signal;

sampling a second status of the unit located four units following the second unit of the group; and decoding a symbol of the group using the first status and the second status;

wherein the first special signal is represented as a "high level" signal and the first logical state is a first special signal covering the first two units of the group, that is, the first logical state is represented as two units of the "high level" signal and the second logical state is represented as one unit of the first special signal covering the first unit of the group, with the states whether first or second logical states, being separated by a second special signal which is a "low level" signal covering four units of the group.

41. The system of claim 40 wherein the critical subset of data includes a plurality of groups each having a symbol.

42. A machine executable process as defined in claim 41 further including the step of preparing for the sampling of a symbol from a succeeding group by adding two units to the unit sampled for the second status of the preceding group if the symbol sampled in the preceding group is the first logical state, or, adding one unit to the unit sampled for the second status of the preceding group if the symbol sampled in the preceding group is the second logical state.

43. A machine executable process as defined in claim 42 further including the steps of:

sampling the first status of the second unit of a succeeding group from the critical subset of data;

sampling a second status of a unit located four units following the second unit of the succeeding group; and decoding a symbol of the succeeding group using the first status and the second status sampled from the succeeding group.

44. A machine executable process as defined in claim 41 further including, after the sampling step to obtain the second status, the step of determining whether an error occurred because the first status is equal to the second status, and if they are, terminating the process.

45. A machine executable process as defined in claim 41 further including, after the sampling step to obtain the second status, the step of determining whether the first status is equal to the second status, and if they are, storing a group number of the group where the first status is equal to the second status and sampling the status of the first and second units of the following group to determine the symbols of the stored group and the group following the stored group.

46. A machine executable process as defined in claim 45 wherein if the third and fourth status sampled the second special signal, the process is terminated and the symbols of the stored group and the next group to the stored group are not determined.

47. A machine executable process as defined in claim 45 wherein the stored group symbol is assumed to have a first logical state and the group following the stored group is assumed to have a second logical state symbol if the third status is found to include the first special signal, and the fourth status is found to include the second special signal.

48. A machine executable process as defined in claim 41 further including the step of encoding a parity symbol with the encoding of the critical subset of data, the parity sampling the symbols of the odd groups of the critical subset of data.

49. A machine executable process as defined in claim 48 further including the steps of:

determining whether the first status has been determined to be equal to the second status in a preceding step;

computing a parity from the symbols of the odd groups read by the transducer head;

determining whether the computed parity is equal to the encoded parity; and terminating the process if the computed parity is equal to the encoded parity, otherwise setting the stored group symbol equal to the first logical state symbol and setting the symbol of the group following the stored group equal to the second logical state.

50. A media format for encoding a critical subset of data on a media, the data perhaps in a format not easily read, said format being capable of error detection and correction comprising a plurality of units in a group with each group identifying a symbol and a first logical state being represented as a first special signal covering the first two units of the group, and a second logical state being represented as the first special signal covering the first one unit of the group, both followed by a second special signal which covers four units of the group, wherein the first special signal is represented as a "high level" signal and the first logical state is a first special signal covering the first two units of the group, that is, the first logical state is represented as two units of the "high level" signal, and the second logical state is represented as one unit of the first special signal covering the first unit of the group, with the states whether first or second logical states, be separated by a second special signal which is a "low level" signal covering four units of the group.

51. A media format as defined in claim 50 further including a second group with the first two units following the second special signal representing a first logical state if both units include the first special signal and a second logical state if only the first unit following the second special signal includes the first special signal.

52. The media format as defined in claim 50 wherein the critical subset of data includes a plurality of groups each having a symbol.

53. A method for controlling a data processing system for the encoding of a critical subset of data stored on a media, the data perhaps in a format not easily read, comprising the steps of:

encoding the critical subset of data on a media, the critical subset of data including a plurality of units with a first logical state being represented as a first special signal covering the first two units of a group, and a second logical state being represented as the first special signal covering the first one unit of the group, both followed by a second special signal which covers four units followed by a repeat with the first two units following the second special signal representing the first logical state if both units include the first special signal and the second logical state if only the first unit following the second special signal includes the first special signal;

sampling a first status of the second unit of the group from said critical subset of data;

sampling a second status of a unit four units following the second unit of the group; and decoding a symbol of the group using the first status and the second status;

wherein the first special signal is represented as a "high level" signal and the first logical state is a first special signal covering the first two units of the group, that is, the first logical state is represented as two units of the "high level" signal, and the second logical state is represented as one unit of the first special signal covering the first unit of the group, with the states whether first or second logical states, being separated by a second special signal which is a "low level" signal covering four units of the group.

54. A method for controlling a data processing system for the encoding of a critical subset of data stored on a media, the data perhaps in a format not easily read, comprising the step of encoding the critical subset of data on the media, said critical subset of data including a plurality of units with a first logical state being represented as a first special signal covering the first two units of a group, and a second logical state being represented as the first special signal covering the first one unit of the group, both followed by a second special signal which covers four units, wherein the first special signal is represented as a "high level" signal and the first logical state is a first special signal covering the first two units of the group, that is, the first logical state is represented as two units of the "high level" signal, and the second logical state is represented as one unit of the first special signal covering the first unit of the group, with the states whether first or second logical states, being separated by a second special signal which is a "low level" signal covering four units of the group.

* * * * *

UNITED STATES PATENT AND TRADEMARK OFFICE
CERTIFICATE OF CORRECTION

PATENT NO. : 5,420,727
DATED : May 30, 1995
INVENTOR(S) : R. B. BASHAM, et al.

It is certified that error appears in the above-indentified patent and that said Letters Patent is hereby corrected as shown below:

Column 7   Line 37
    Change "witch" to --with--.

In dependent claims 1, 6, 11, 12, 13, 38, 40, 50, 53 and 54
    Delete "the data perhaps in a format not easily read,".

In dependent claims 22, 25, 27, 28, 29, 30, 33, 35, 36, and 37
    Delete "the identifier perhaps in a format not easily read,".

Signed and Sealed this

Thirtieth Day of April, 1996

Attest:

BRUCE LEHMAN

Attesting Officer    Commissioner of Patents and Trademarks